W. V. TURNER.
REGENERATIVE BRAKE DEVICE.
APPLICATION FILED JUNE 30, 1917.
1,283,979.
Patented Nov. 5, 1918.
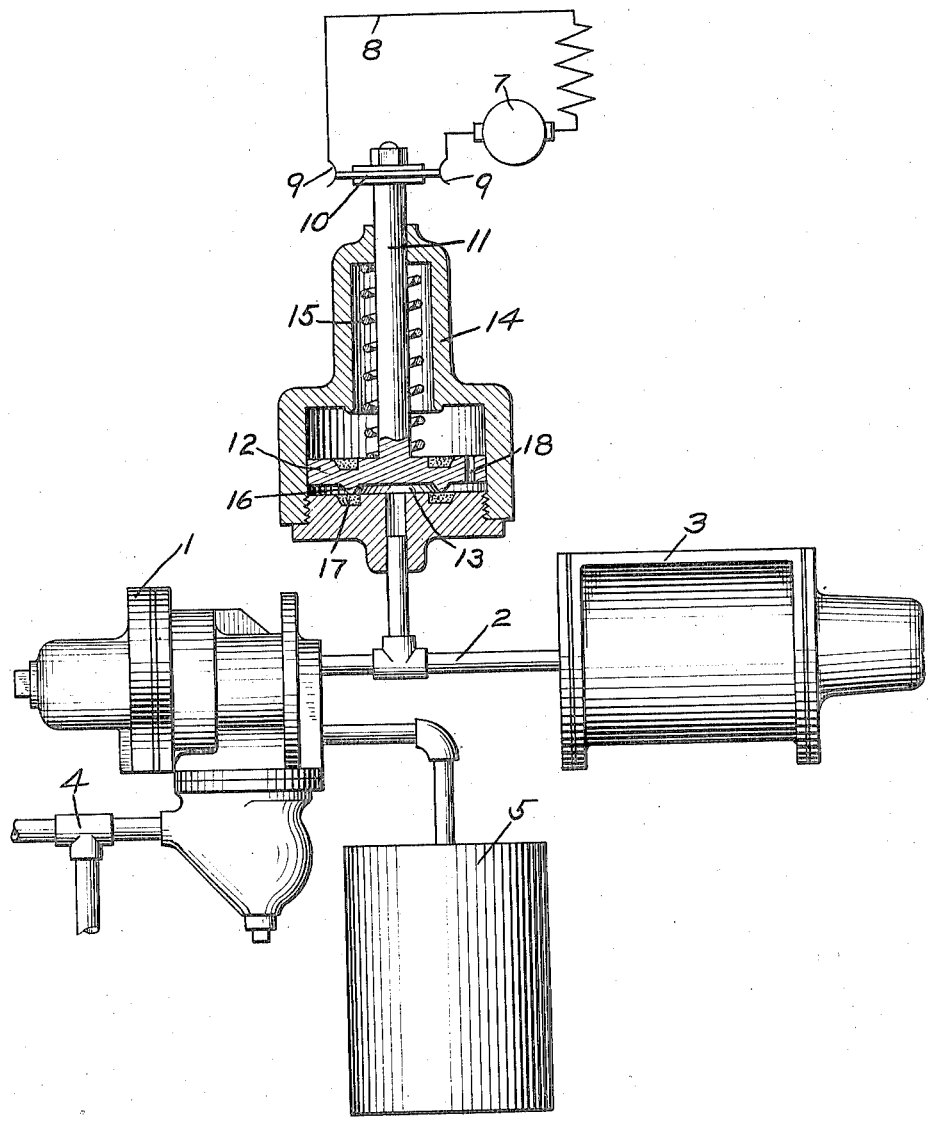
INVENTOR
Walter V. Turner
by Wm. M. Cady
Att'y.

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

REGENERATIVE BRAKE DEVICE.

1,283,979.     Specification of Letters Patent.     Patented Nov. 5, 1918.

Application filed June 30, 1917. Serial No. 177,975.

*To all whom it may concern:*

Be it known that I, WALTER V. TURNER, a citizen of the United States, residing at Wilkinsburg, in the county of Allegheny and State of Pennsylvania, have invented new and useful Improvements in Regenerative Brake Devices, of which the following is a specification.

This invention relates more particularly to a brake equipment in which a regenerative brake is employed at one time and a fluid pressure brake at another time.

Where the brakes are applied by fluid under pressure, it is undesirable that the regenerative brake be set into action, since this is liable to produce an excessive braking power due to the combined braking action of the regenerative brake and the fluid pressure brake.

The principal object of my invention is to provide means operated upon applying the brakes by fluid under pressure for cutting the regenerative brake out of action.

In the accompanying drawing, the single figure is a diagrammatic view, partly in section, of a fluid pressure brake equipment and a regenerative brake, with my invention applied thereto.

As shown in the drawing, the fluid pressure brake equipment may comprise a triple valve device 1 for supplying and releasing fluid under pressure through pipe 2 to and from brake cylinder 3, a brake pipe 4 connected to the triple valve device 1 and the usual auxiliary reservoir 5.

The regenerative brake is represented diagrammatically by a motor-generator 7 connected in a regenerative circuit 8.

According to my invention, a switch controls the regenerative circuit 8 and comprises fixed contacts 9 connected in said circuit and a movable contact 10 adapted to open and close the regenerative circuit through the contacts 9.

The movable contact 10 is connected by a stem 11 to a piston 12 contained in piston chamber 13 of a switch casing 14.

A spring 15 acts on piston 12 and tends to hold the switch closed and piston chamber 13 is connected to brake cylinder pipe 2.

Piston 12 is provided with a seating ring 16 adapted to engage a seat 17, so as to normally expose only a restricted area of the piston to brake cylinder pressure.

In operation, when the fluid pressure brakes are applied, fluid under pressure is supplied by the triple valve device 1 through pipe 2 to the brake cylinder 3 and also flows to the seated area of piston 12, thereby causing the piston to lift from its seat, and the full area of said piston being then exposed to brake cylinder pressure, the prompt and sudden movement of the piston to open the switch is effected.

It will now be evident that when the fluid pressure brakes are applied, the regenerative braking circuit 8 is opened, so that the regenerative brake cannot be brought into action, but so long as the fluid pressure brakes remain released, the regenerative brake circuit is held closed, permitting the regenerative brake to act in the usual manner.

In order to permit the escape of fluid which may possibly leak past the seat 17 when the piston 12 is in its seated position and thus cause the operation of the piston, a port 18 may be provided through the piston 12.

Having now described my invention, what I claim as new and desire to secure by Letters Patent, is:—

1. The combination with a fluid pressure brake equipment and a regenerative brake apparatus, of means operated upon applying the brakes by fluid under pressure for cutting the regenerative brake apparatus out of action.

2. The combination with a fluid pressure brake and a regenerative brake having a local closed circuit, of means operated upon applying the fluid pressure brakes for opening the circuit of the regenerative brake.

3. The combination with a regenerative brake apparatus, of a switch controlling the regenerative brake circuit, a brake cylinder, and a piston operated by fluid supplied to the brake cylinder for controlling said switch.

In testimony whereof I have hereunto set my hand.

WALTER V. TURNER.